United States Patent
Varennes et al.

(10) Patent No.: US 7,798,788 B2
(45) Date of Patent: Sep. 21, 2010

(54) FIXING DEVICE FOR A VACUUM PUMP

(75) Inventors: Nicolas Varennes, Brison-St-Innocent (FR); Olivier Dauvillier, Marcellaz-Albanais (FR)

(73) Assignee: Alcatel, Paris (FR)

( * ) Notice: Subject to any disclaimer, the term of this patent is extended or adjusted under 35 U.S.C. 154(b) by 789 days.

(21) Appl. No.: 11/557,962

(22) Filed: Nov. 8, 2006

(65) Prior Publication Data

US 2007/0104598 A1  May 10, 2007

(30) Foreign Application Priority Data

Nov. 10, 2005  (FR) .................................. 05 53428

(51) Int. Cl.
*F04D 19/04* (2006.01)
*F01D 1/36* (2006.01)

(52) U.S. Cl. .................. 417/360; 417/363; 417/423.15; 403/335; 285/368; 415/90

(58) Field of Classification Search .............. 417/423.4, 417/423.15, 360, 363; 415/90; 403/335, 403/336, 337, 199, 262; 285/368; 248/638
See application file for complete search history.

(56) References Cited

U.S. PATENT DOCUMENTS

| | | | | | |
|---|---|---|---|---|---|
| 1,046,127 | A | * | 12/1912 | Weatherwax | 166/96.1 |
| 1,462,698 | A | * | 7/1923 | Haughey | 285/412 |
| 2,397,591 | A | * | 4/1946 | Becker | 417/154 |
| 2,550,138 | A | * | 4/1951 | Crawford | 285/189 |
| 2,646,958 | A | * | 7/1953 | Coykendall, Jr. | 248/611 |
| 2,879,977 | A | * | 3/1959 | Trought | 165/80.3 |

(Continued)

FOREIGN PATENT DOCUMENTS

CH            674073 A  *  4/1990

(Continued)

OTHER PUBLICATIONS

English Database Abstract for CH674073A.*

*Primary Examiner*—Devon C Kramer
*Assistant Examiner*—Nathan Zollinger
(74) *Attorney, Agent, or Firm*—Carmen Patti Law Group, LLC

(57) ABSTRACT

The present invention relates to the field of high rotation speed vacuum pumps, which are fastened to and connected to a structure such as a vacuum enclosure or a pipe to generate a hard vacuum. It consists in an annular fixing flange including holes cooperating with headed bolts to fasten a vacuum pump to a structure. The flange comprises an upper ring and a lower ring cooperating to clamp the end of the pump body between the upper ring and the lower ring, and at least one first cavity in a face of the upper ring that is in a plane perpendicular to that of the face of the upper ring intended to come into contact with the wall of the structure. The invention also consists in a fixing system comprising an annular flange disposed coaxially with the pump body around the inlet orifice of the pump. At least one second cavity in the face of the end of the pump body in contact with a face of the upper ring is coupled with the first cavity to form a housing, and at least one flexible material stud inserted into the housing.

12 Claims, 5 Drawing Sheets

U.S. PATENT DOCUMENTS

| | | | | |
|---|---|---|---|---|
| 2,889,396 | A * | 6/1959 | Boden et al. | 174/161 R |
| 3,219,369 | A * | 11/1965 | Little | 285/363 |
| 3,298,719 | A * | 1/1967 | Bills et al. | 285/336 |
| 3,398,978 | A * | 8/1968 | Gasche | 285/187 |
| 3,453,010 | A * | 7/1969 | Wagner et al. | 285/368 |
| 3,455,583 | A * | 7/1969 | Ray | 285/367 |
| 3,515,416 | A * | 6/1970 | Pickert | 285/413 |
| 3,747,963 | A * | 7/1973 | Shivak | 285/336 |
| 4,037,980 | A * | 7/1977 | Haentjens | 403/336 |
| 4,225,161 | A * | 9/1980 | Smith | 285/137.11 |
| 4,537,425 | A * | 8/1985 | Press et al. | 285/55 |
| 5,163,712 | A * | 11/1992 | Sabo et al. | 285/7 |
| 5,443,240 | A * | 8/1995 | Cunningham | 248/638 |
| 5,671,956 | A * | 9/1997 | Crawford | 285/328 |
| 5,700,014 | A * | 12/1997 | Morita et al. | 277/614 |
| 5,716,083 | A * | 2/1998 | Carr | 285/368 |
| 5,735,668 | A * | 4/1998 | Klein | 415/172.1 |
| 6,050,614 | A * | 4/2000 | Kirkpatrick | 285/368 |
| 6,485,254 | B1 * | 11/2002 | Davis | 415/9 |
| 6,575,713 | B2 * | 6/2003 | Ohtachi et al. | 417/353 |
| 6,705,830 | B2 * | 3/2004 | Yamashita et al. | 415/9 |
| 6,712,403 | B1 * | 3/2004 | Dusevic | 285/368 |
| 6,752,588 | B2 * | 6/2004 | Kawanishi et al. | 415/90 |
| 6,854,956 | B2 * | 2/2005 | Miwata et al. | 415/90 |
| 7,059,823 | B2 * | 6/2006 | Sakaguchi et al. | 415/9 |
| 7,216,899 | B2 * | 5/2007 | Crawford | 285/415 |
| 7,300,261 | B2 * | 11/2007 | Cafri et al. | 417/363 |
| 7,341,423 | B2 * | 3/2008 | Kabasawa et al. | 415/90 |
| 2003/0095863 | A1 * | 5/2003 | Okudera et al. | 415/90 |
| 2003/0234541 | A1 * | 12/2003 | Thompson | 285/412 |
| 2005/0029417 | A1 * | 2/2005 | Scheps et al. | 248/201 |
| 2005/0204754 | A1 * | 9/2005 | Vuillermoz | 62/55.5 |
| 2005/0244219 | A1 * | 11/2005 | Mathes et al. | 403/335 |
| 2009/0068011 | A1 * | 3/2009 | Kalisch et al. | 415/220 |
| 2009/0211653 | A1 * | 8/2009 | Schofield | 137/565.23 |

FOREIGN PATENT DOCUMENTS

| | | |
|---|---|---|
| EP | 0 887 556 A1 | 12/1998 |
| EP | 1 118 774 A2 | 7/2001 |
| EP | 1 413 761 A2 | 4/2004 |
| JP | 10274189 A * | 10/1998 |
| WO | WO 2004/020839 A2 | 3/2004 |

* cited by examiner

FIG_1
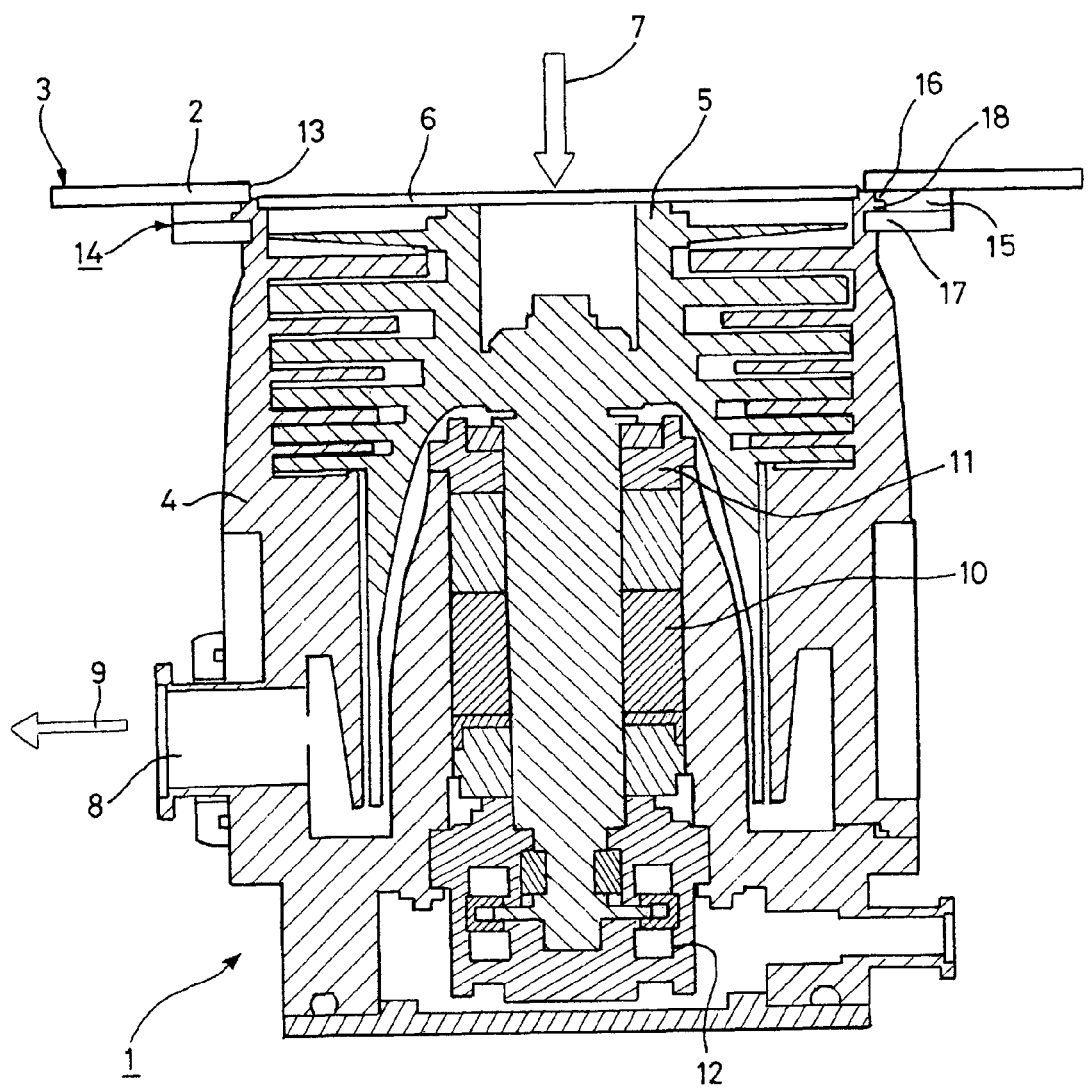

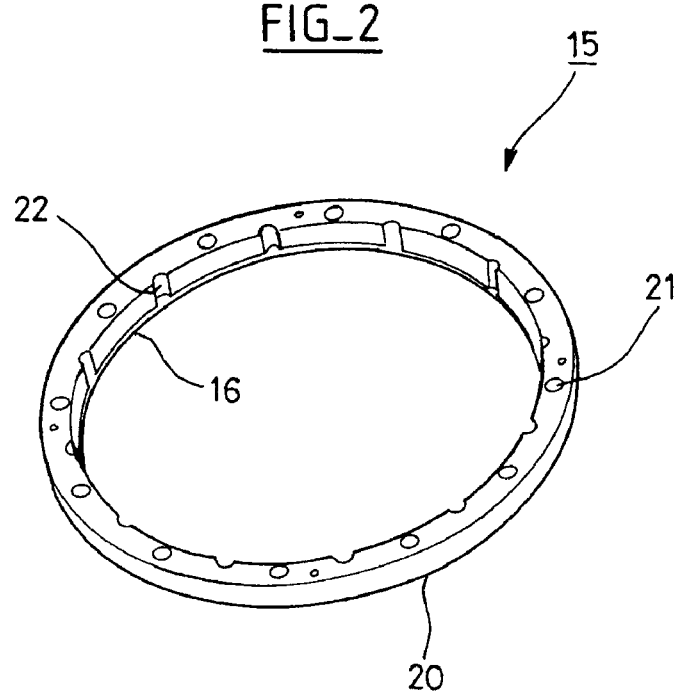
FIG_2
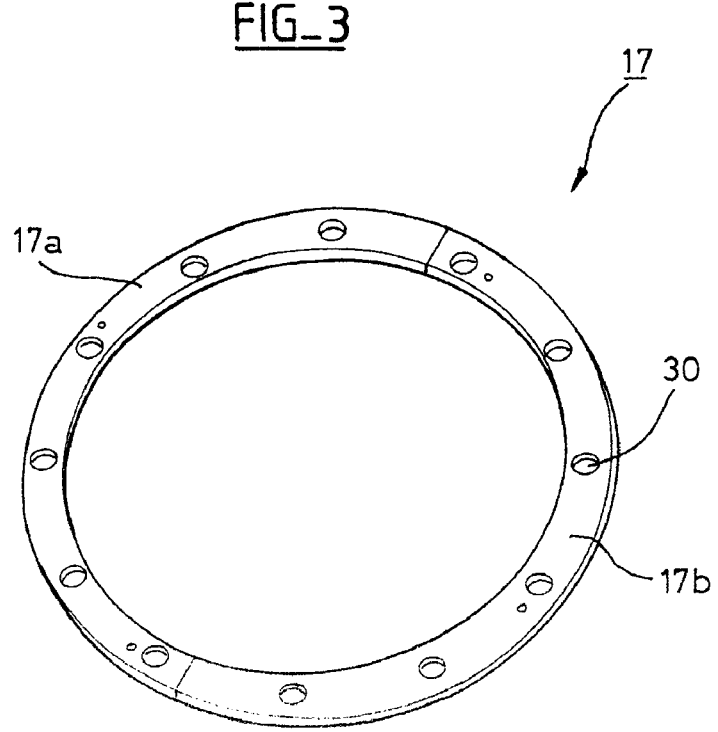
FIG_3

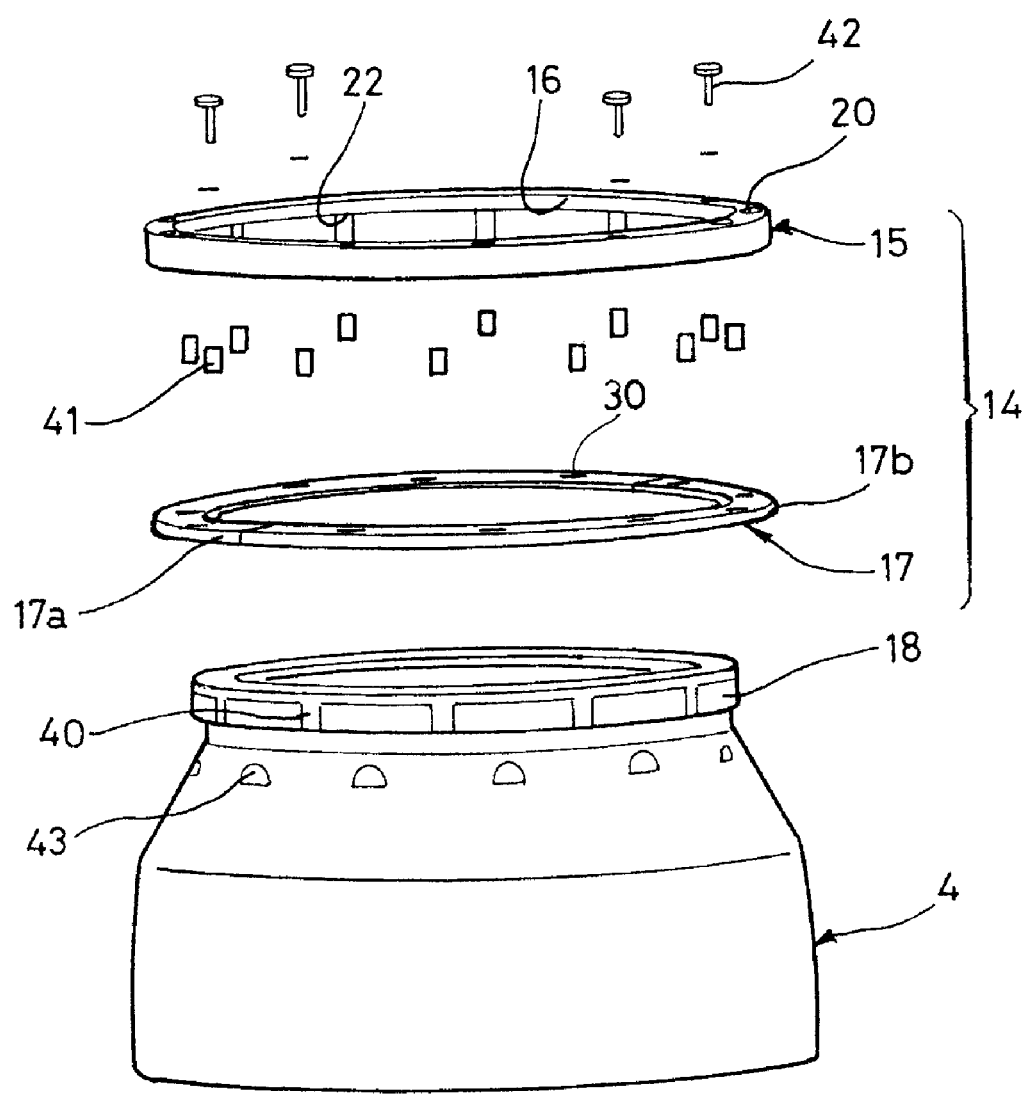
FIG_4

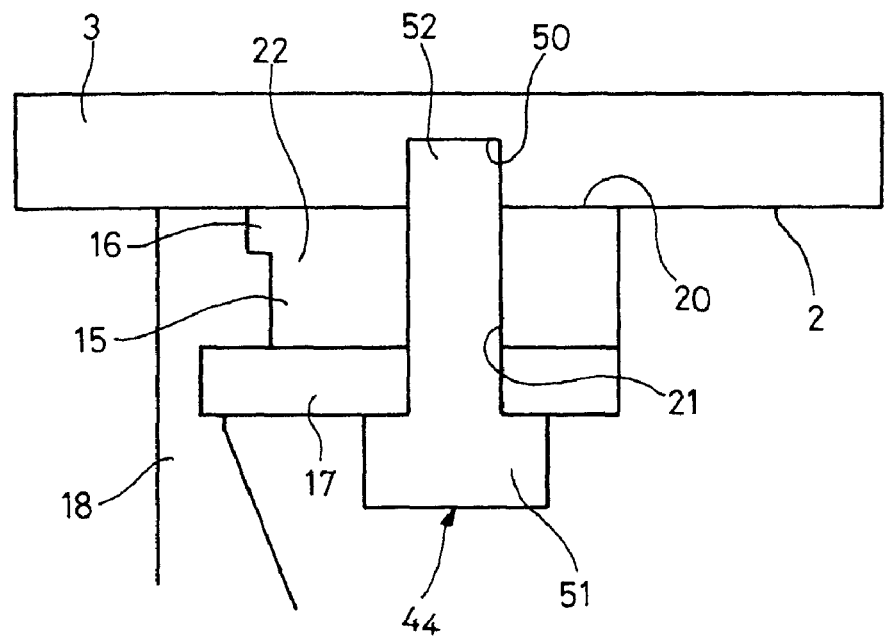
FIG_5
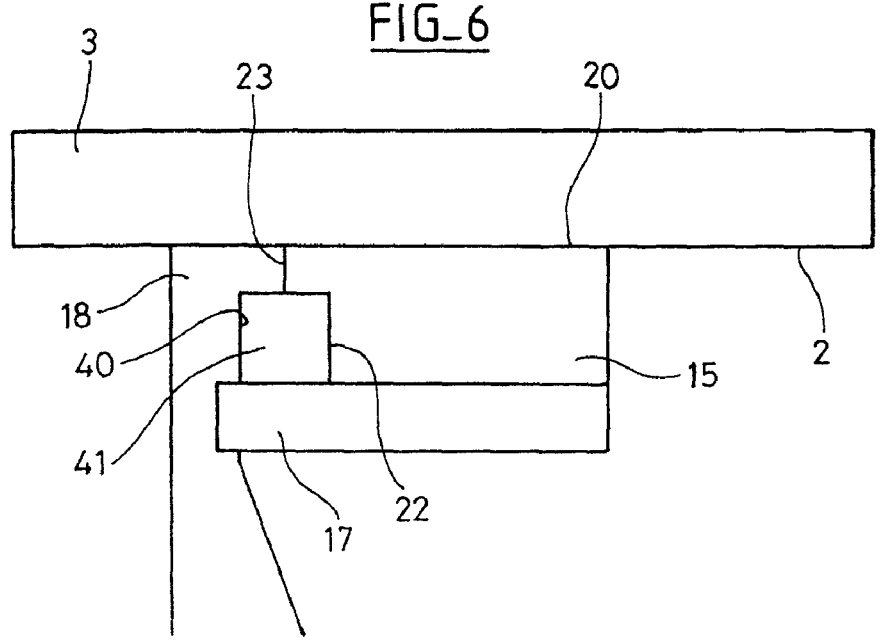
FIG_6

FIG_7
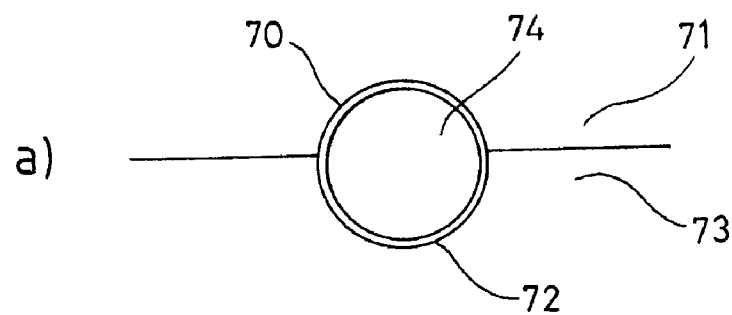
a)
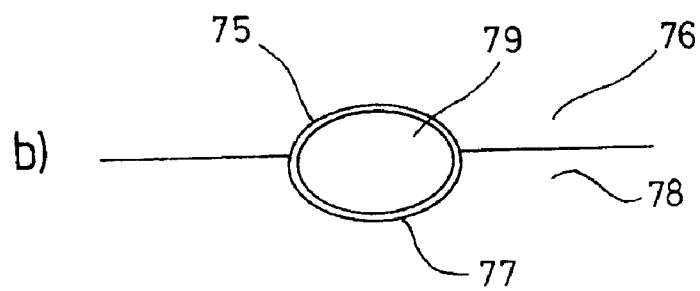
b)
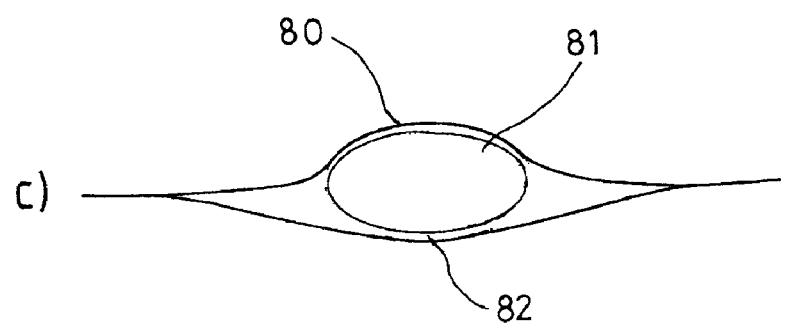
c)

FIXING DEVICE FOR A VACUUM PUMP

CROSS-REFERENCE TO RELATED APPLICATIONS

This application is based on French Patent Application No. 0553428 filed Nov. 10, 2005, the disclosure of which is hereby incorporated by reference thereto in its entirety, and the priority of which is hereby claimed under 35 U.S.C. §119.

BACKGROUND OF THE INVENTION

1. Field of the Invention

The present invention relates to the field of high rotation speed vacuum pumps, which are fastened to and connected to a structure such as a vacuum enclosure or a pipe to generate a hard vacuum. It concerns more particularly a device for fixing such vacuum pumps.

2. Description of the Prior Art

In the electronic and micromechanical component industries, machining or plasma processing methods are executed inside an enclosure in which a controlled vacuum must be maintained.

Generating the vacuum necessitates the use of pumps capable of quickly generating and maintaining a hard vacuum adapted to the machining or processing method. Turbomolecular type pumps are generally used, consisting of a pump body in which a rotor is driven in rotation at high speed, for example at more than thirty thousand revolutions per minute. With such high rotation speeds, the rotor acquires a very high kinetic energy.

The pump bodies include a coaxial inlet orifice that is connected to an outlet orifice of the structure such as the vacuum enclosure or the pipe. The pump is generally fastened only to the structure, and is supported only by the area surrounding the pump inlet orifice and the corresponding orifice of the structure. The pump body therefore includes a coaxial annular flange around the inlet orifice, threaded holes are provided on the wall of the structure around the outlet orifice, holes are provided through the coaxial annular flange of the pump body, and headed bolts are fitted so that their shanks pass through the latter holes and bolt into threaded holes in the wall of the structure to fasten the vacuum pump to the structure with the flange pressed against the wall of the structure.

The shanks of the bolts are conventionally cylinders of circular section, with a smooth portion that passes through a hole having a diameter slightly greater than the diameter of the shank, and with a threaded end portion that is screwed into an associated threaded hole.

Standards specify the respective dimensions of the flange, the bolts and the necessary holes, together with the number of bolts and holes, as a function of the pump diameters.

Accordingly, for an ATHM type turbomolecular pump from ALCATEL, the pump is fixed by providing a flange of the DN 250 iso-F type conforming to the "PNEUROP 66061" standard, with twelve bolts of M10 type the shank whereof has a length of approximately thirty millimeters for a diameter of ten millimeters, and the holes in the flange and the structure have a nominal diameter of eleven millimeters.

Such fixing structures are entirely satisfactory under normal conditions of use, and are thus able to withstand the mechanical forces generated by the operation of the vacuum pump in normal use.

On the other hand, it has been found that an insurmountable problem may arise in the event of accidental destruction of the pump rotor when rotating at full speed. On this assumption, the rotor running at the full rotation speed is then out-of-balance, may violently strike the wall of the pump body, imparting to it a transverse or radial displacement force, and may rub strongly on the wall of the pump body, imparting to it a coaxial rotation torque. Because of the high energy stored in the rotor rotating at high speed, the mechanical stresses applied by the rotor to the pump body are very high, and those stresses are transmitted to the device fixing the vacuum pump to the structure. This results in violent shear forces on the fixing bolts, and it has been found that in current structures these forces cause the bolts to break. The pump is then detached from the structure and constitutes a dangerous projectile that can fly around the place of use.

One solution is proposed by the document WO-2004/020 839, which describes a device for fixing a vacuum pump to a wall of the structure, comprising an annular flange coaxial with and fastened to the vacuum pump body around the inlet orifice. Threaded holes are provided on the wall of the structure, through-holes are provided in the annular flange, and headed bolts are fitted so that their shanks pass through the through-holes and are screwed into the associated threaded holes to fasten the vacuum pump to the structure, with the flange pressed against the wall of the structure. The through-holes comprise a distal portion in the shape of a circular section cylinder followed by a coaxial enlarged proximal portion of circular section adjacent the wall of the structure. In the event of shear forces in any lateral direction in the area of the connection between the vacuum pump and the structure, this conformation allows flexing of the bolt shank and a corresponding lateral offset between the through-hole and the associated threaded hole.

This solution absorbs the violent shear forces to which the fixing bolts are subjected. However, the rotor rotation speed is higher in new generation turbomolecular pumps. In the event of a pump crash, the energy that must be dissipated and not transmitted to the structure becomes much greater and in this configuration the yield strength prior to the bolts breaking becomes insufficient. Furthermore, this solution does not prevent the pump from becoming detached from the structure in the event of the bolts breaking.

An object of the present invention is to eliminate the drawbacks of the prior art. To this end the invention proposes to modify the vacuum pump fixing structure to increase the strength with which the vacuum pump is retained on the structure and to prevent the fixing bolts breaking and the pump separating in the event of the rotor bursting while running at full rotation speed, whilst remaining compatible with the applicable standards.

SUMMARY OF THE INVENTION

To this end, the present invention proposes an annular flange for fixing a vacuum pump to a wall of a structure, including holes adapted to cooperate with headed bolts for fastening the vacuum pump to the structure with the flange pressed against the wall, characterized in that it comprises an upper ring and a lower ring cooperating to clamp the end of the pump body between the upper ring and the lower ring, at least one cavity formed in a face of the upper ring that is in a plane perpendicular to that of the face of the upper ring intended to come into contact with the wall of the structure.

The invention also consists in a system for fixing a vacuum pump to a wall of a structure comprising an annular flange disposed coaxially with the pump body around the inlet orifice of the pump and including holes adapted to cooperate with headed bolts for fastening the vacuum pump to the structure with the flange pressed against the wall, characterized in that:

the annular flange comprises an upper ring and a lower ring cooperating to clamp the end of the pump body between the upper ring and the lower ring, at least one first cavity in a face of the upper ring in contact with a face of the end of the pump body and at least one second cavity in the face of the end of the pump body, the first cavity being coupled with the second cavity to form a housing, and at least one flexible material stud inserted into the housing.

In a preferred embodiment, the first cavity is in a face of the upper ring that is in a plane perpendicular to that of the face of the upper ring intended to come into contact with the wall of the structure.

In a variant, the housing has a circular section in a plane perpendicular to the axis of the pump body.

This shape of housing associated with cylindrical studs leads to a configuration in which the studs are loaded in shear in the event of a failure. This type of configuration has the advantage of simple fabrication and of allowing the pump to rotate in the flange through a maximum angle of 5°, which the studs can accommodate without breaking.

The maximum size of the housing and of the stud must be compatible with the constraints imposed by standardization of the flange. The housing is produced with a diameter equal to or very slightly less than that of the stud to enable introduction of the studs with a slight radial compression by virtue of the elasticity of the material; the studs are therefore unable to escape from their housing. For example, the fixing system according to the invention may include housings having a diameter of 10±0.1 mm and studs of diameter 10±0.5 mm for a height of 14±0.5 mm, which leads to a maximum compression of the stud of 0.6 mm.

In another variant, the housing has an oblong section in a plane perpendicular to the axis of the pump body.

The housing delimited by the coupling of the cavity on the flange and the cavity at the end of the pump body is advantageously of oblong shape in order to increase the volume of the studs, with the aim of improving their damping capacity, at the same time as complying with the geometrical constraints of the standard.

In one particular embodiment of the invention, the cavities forming the housing when coupled are of rounded shape with different radii of curvature for each of the cavities. One of the cavities forming the housing preferably has a rounded shape espousing that of the stud and rounded corners in order to prevent contact with sharp edges degrading the stud. The other cavity has a much larger radius of curvature, allowing working in compression, reducing the stress on the stud. In this type of configuration, compression of the studs in the housing allows a 30° rotation of the pump body, preventing the studs from breaking.

Destruction of the rotor leading to rotation of the pump body generates compression stresses over the length of the stud that are absorbed by virtue of the elastic deformation properties of the material constituting the stud.

According to the invention, the stud is made of a flexible material, preferably an elastomer material. The nature of the material constituting the studs, in terms of stiffness and damping quality, allow slight displacement of the flange relative to the end of the pump body without the stud breaking. The elastomer is preferably chosen from polysiloxanes, polychloroprenes and their copolymers, homopolymers and copolymers of isoprene, and homopolymers and copolymers of isobutylene, and in particular a copolymer of isobutylene and isoprene.

For a configuration working in shear, a polychloroprene with a Shore hardness of 70 will be preferred. For a configuration working in compression, a copolymer of isobutylene and isoprene with a Shore hardness of 70 will be preferred.

In the extreme situation where the stud breaks, the safety of the installation will nevertheless continue to be assured because the pump body sandwiched between the upper ring and the lower ring will turn between them without risk of the retaining bolts breaking.

The invention further consists in a method of fixing a vacuum pump to a wall of a structure by means of a fixing system comprising an annular flange disposed coaxially with the pump body around the inlet orifice of the pump and including holes adapted to cooperate with headed bolts to fasten the vacuum pump to the structure with the flange pressed against the wall. According to the invention, the annular flange includes an upper ring and a lower ring consisting of two half-rings. The method comprises the following steps:

the upper ring is placed around the end of the pump body from above, the upper ring including at least one first cavity in its face in contact with an end face of the pump body and being coupled to a second cavity in the face of the end of the pump body to form a housing, a stud is inserted into the housing from below, each half-ring constituting a lower ring is placed around the end of the pump body under the upper ring, the upper ring and the lower ring are assembled by bolts, the assembly comprising the flange around the pump body is fixed to the wall of the structure by means of headed bolts.

Other features and advantages of the present invention will become apparent on reading the following description of one embodiment, which is of course given by way of illustrative and nonlimiting example, and from the appended drawings.

BRIEF DESCRIPTION OF THE DRAWINGS

FIG. 1 is a diagrammatic view showing a turbomolecular pump structure according to the present invention in longitudinal section and its fixing to a structure such as a vacuum enclosure.

FIG. 2 is a bottom view of the upper ring according to the invention.

FIG. 3 is a top view of the lower ring according to the invention.

FIG. 4 is an exploded perspective view of the fixing device according to the invention.

FIG. 5 is a view in section of the fixing system according to the invention in the plane of the bolts fixing the pump to the structure.

FIG. 6 is a view in section of the fixing system according to the invention in the plane of the studs.

FIGS. 7a, 7b and 7c show variants of a housing and the associated stud.

DETAILED DESCRIPTION OF THE PREFERRED EMBODIMENT

Consider first of all FIG. 1, showing a turbomolecular type vacuum pump structure 1 fastened to a wall 2 associated with a structure 3 such as a vacuum enclosure, for example.

The vacuum pump 1 comprises a pump body 4 in which a rotor 5 rotates at high speed about the axis I-I of the pump body 4. The pump body 4 includes an inlet orifice 6 coaxial with the pump body 4 through which the pumped gases 7 enter and a discharge orifice 8 through which the discharge gases 9 are evacuated. The rotor 5 is driven in rotation in the pump body 4 by an internal motor 10 and is guided laterally by magnetic or mechanical bearings 11 and 12.

The wall 2 associated with the structure 3 comprises a pumped gas outlet orifice 13 in corresponding relationship with the inlet orifice 6 of the vacuum pump 1. The structure 3 delimits a closed enclosure isolated from the outside environment and in which the vacuum pump 1 is able to create a controlled vacuum. The wall 2 may be the envelope of the structure or of fixing means connected to the structure, such as for example a flange associated with a structure such as a vacuum enclosure or a pipe, adapted to receive the fixing flange of the pump.

According to the present invention, a stainless steel annular flange 14 including an upper ring 15 provided with a shoulder 16 and a lower ring 17 is fitted onto the body 4 of the vacuum pump 1, around the end 18 of the pump body 4 coaxial with the inlet orifice 6, in order to enable the vacuum pump 1 to be fixed to the wall 2 of the structure 3. The shoulder 16 allows axial positioning of the upper ring 15 on the pump body 4.

FIG. 2 is a perspective view of the upper ring 15 in accordance with the present invention. The upper ring 15 is intended to have its contact face 20 against the wall 2 of a structure 3. The ring 15 is of annular shape and includes a shoulder 16 intended to facilitate placing it over the end 18 of the pump body 4. In the embodiment represented in FIG. 2, the ring 15 has twelve regularly spaced through-holes 21 in it, in accordance with the "PNEUROP 66061" standard currently in force. In one particular embodiment the through-holes are of the type described in the document WO-2004/020839 and comprise a distal portion in the shape of a cylinder of circular section followed by a coaxial enlarged proximal portion of circular section adjacent the wall of the structure. In practice, the proximal portion of the through-holes may advantageously have a proximal portion in the shape of a cylinder of circular section joined to the distal portion of the through-hole by a frustoconical distal portion of circular section.

The upper ring 15 also comprises twelve cavities 22 regularly distributed over its annular internal wall 23 in contact with the end 18 of the pump body and disposed between the through-holes 21 of each pair.

FIG. 3 shows in perspective the lower ring 17 which also has twelve through-holes 30 in it corresponding to the through-holes 21 in the upper ring 15. To enable positioning of the lower ring 17 around the end 18 of the pump body 4, it consists of two half-rings 17a and 17b.

The FIG. 4 exploded perspective view shows the upper ring 15, the lower ring 17 and the end 18 of the pump body 4. The end 18 of the pump body 4 carries cavities 40 that are coupled to respective cavities 22 of the upper ring 15 to form housings 40-22 adapted to accommodate studs 41.

These three components are assembled as follows.

(a) The upper ring 15 is placed around the upper end 18 of the body 4 of the turbomolecular pump 1 from above. The shoulder 16 on the upper annular ring 15 enables its axial position on the pump body 4 to be adjusted.

(b) The studs 41 are inserted into their housings 40-22 from below.

(c) The lower ring 17 is fitted by disposing each half-ring 17a and 17b around the end 18 of the turbomolecular pump, under the upper ring 15. The upper ring 15 and the two lower half-rings 17a and 17b are assembled by bolts 42 to constitute the annular flange 14. Notches 43 are provided in the pump body 4 to facilitate the passage of the bolts 42. In this way it is possible to transport the turbomolecular pump and to fasten it to the structure or chassis 3 without having to hold the upper ring 15 in place manually.

(d) The assembly comprising the turbomolecular pump 4 and the annular flange 14 is fixed to the chassis 3 by headed bolts 44 in the smooth holes 21 and 30 passing through the rings 15 and 17, respectively.

In the event of destruction of the rotor 5 when running at the full rotation speed, the kinetic energy stored in the rotor 5 is transmitted to the pump body 4, which tends to rotate. The invention aims to absorb this energy thanks to the elastic deformation properties of the material of the studs. Clearly, the pump body 4 can move in rotation until the stud 41 abuts against the lateral wall of the volume formed by the coupled cavities 22 and 40. The nature of the elastomer studs, in terms of stiffness and damping quality, will allow a small displacement of the annular flange 14 relative to the end 18 of the pump body 4 without breaking the studs 41. Energy is dissipated by crushing the studs 41. The structure of the system therefore guarantees that the bolts 44 will remain in place in any event because the shear stresses imposed on them are greatly reduced.

Moreover, if one of the studs 41 is unable to absorb sufficient energy to prevent it breaking, the debris from the stud 41 will infiltrate in the rotation direction between the annular flange 14 and the end 18 of the pump body 4, the effect of which will be to continue to brake the rotation of the pump body 4, preventing it from turning freely inside the flange 14.

FIG. 5 shows the fixing system according to the present invention in section in the plane of the bolts 44 for fixing the pump to the structure. In accordance with the applicable standards, threaded holes 50 distributed around the outlet orifice 13 are provided in the wall 2 of the structure 3. Associated smooth through-holes 21 are provided in the upper ring 15 into which bolts 44 with heads 51 are fitted so that their shanks 52 pass through the holes 21 and screw into the associated threaded holes 50 to fasten the vacuum pump 1 to the structure 3 with the face 20 of the flange 14 pressed against the wall 2 of the structure 3.

FIG. 6 is a view of the fixing system according to the invention in section in the plane of the studs 41, parallel to that of FIG. 5. According to the invention, the annular internal face 23 of the upper ring 15 comprises cavities 22. The end 18 of the pump body 4 also comprises cavities 40. The cavities 22 and 40 cooperate in pairs to form housings 40-22 into which studs 41 made of a flexible material are inserted. This material is preferably an elastomer such as a polysiloxane, a polychloroprene or a copolymer of chloroprene, isoprene or a copolymer of isoprene, or isobutylene or a copolymer of isobutylene. Here the material used is a copolymer of isoprene and isobutylene.

FIG. 7a shows the mounting in shear of a cylindrical stud in accordance with a different embodiment of the invention. The volume of the housing, delimited by the cavity 70 in the upper ring 71 and the cavity 72 on the end 73 of the pump body, has a circular section in a plane perpendicular to the axis of the pump body. The volume of the housing is adapted to allow compression of the stud 74 in its housing.

FIG. 7b shows the mounting in shear of an oblong stud in accordance with a further embodiment. The volume limited by the cavities 75 in the upper ring 76, the cavity 77 on the end 78 of the pump body and the stud 79 may advantageously be of oblong shape, i.e. have a length greater than their width. This embodiment increases the volume of the stud 79, and therefore the quantity of polymer, with the aim of improving the damping capacities of the stud 79 at the same time as complying with the geometrical constraints of the standard.

FIG. 7c shows the mounting in compression of a cylindrical stud in accordance with a further embodiment. The upper portion of the housing 80 has a dimension very close to that of the stud 81 and rounded corners to prevent sharp edges shearing the stud 81. The lower portion 82 has a much larger radius of curvature for gentler working in compression. With this type of mounting, the cylindrical studs 81 are loaded in compression in the event of a failure.

The invention is not limited to the embodiments described and lends itself to many variants that will be readily apparent to the person skilled in the art. Naturally, the invention applies not only to vacuum pumps fixed by a system with twelve bolts conforming to the "PNEUROP 66061" standard, but also to vacuum pumps of different sizes fixed by different standardized systems adapted to their size.

The invention claimed is:

1. A system of rings for fixing a vacuum pump to a wall of a structure the body of the pump having an end capable of being clamped by the system of rings, said system of rings including bolt holes adapted to cooperate with headed bolts for fastening the vacuum pump to the structure with the system of rings pressed against the wall, characterized in that the system of rings comprises:
    a lower ring and
    an upper ring cooperating to clamp the end of the pump body between the upper ring and the lower ring, the upper ring including
        a contact face that is intended to come into contact with the wall of the structure and
        an annular face perpendicular to the contact face and adapted to be installed parallel to and in contact with a face of the end of the pump body said annular face having at least one cavity formed therein, said cavity being separate from the bolt holes, and at least one flexible material stud inserted into each said cavity.

2. A system for fixing a vacuum pump to a wall of a structure, comprising a system of rings disposed coaxially with an end of the pump body around the inlet orifice of the pump and including bolt holes adapted to cooperate with headed bolts for fastening the vacuum pump to the structure with the system of rings pressed against the wall, characterized in that:
    the system of rings comprises an upper ring and a lower ring cooperating to clamp the end of the pump body between the upper ring and the lower ring,
    wherein there is at least one first cavity, separate from the boll holes, in a face of the upper ring for installation parallel to and in contact with a face of the end of the pump body, and at least one second cavity, separate from any bolt holes, in the face of the end of the pump body, the first cavity being coupled with the second cavity, and the space formed by the coupled cavities being a stud housing, and
    at least one flexible material stud inserted into the stud housing.

3. A fixing system according to claim 2, wherein the first cavity is in a face of the upper ring that is in a plane perpendicular to that of the face of the upper ring intended to come into contact with the wall of the structure.

4. A fixing system according to claim 2, wherein the housing has a circular section in a plane perpendicular to the axis of the pump body.

5. A fixing system according to claim 2, wherein the housing has an oblong section in a plane perpendicular to the axis of the pump body.

6. A fixing system according to claim 2, wherein the cavities forming the housing when coupled are of rounded shape with different radii of curvature for each of the cavities.

7. A fixing system according to claim 2, wherein the stud is made of an elastomer.

8. A fixing system according to claim 7, wherein the elastomer is chosen from polysiloxanes, polychloroprenes and their copolymers, homopolymers and copolymers of isoprene, and homopolymers and copolymers of isobutylene.

9. A method of fixing a vacuum pump to a wall of a structure by means of a fixing system comprising a system of rings disposed coaxially with the pump body around the inlet orifice of the pump and including bolt holes adapted to cooperate with headed bolts to fasten the vacuum pump to the structure with the system or rings pressed against the wall, characterized in that the system of rings includes an upper ring and includes a lower ring consisting of two half-rings and in that the method comprises the following steps:
    the upper ring is placed around the end of the pump body from above, the upper ring including at least one first cavity, separate from the bolt holes, in a face of the upper ring placed in contact with a face of the end of the pump body,
    the upper ring is place in contact with and aligned with the face of the end of pump body so that the first cavity is coupled to a second cavity, separate from any bolt holes in the face of the end of the pump body, the space formed by the coupled cavities being, a stud housing,
    a stud is inserted into the stud housing from below,
    each half-ring constituting a lower ring is placed around the end of the pump body under the upper ring,
    the upper ring and the lower ring are assembled by bolts,
    the assembly comprising the system of rings around the pump body is fixed to the wall of the structure by means of headed bolts.

10. The fixing system according to claim 5, wherein the housing with an oblong section is fitted with a stud of corresponding oblong section.

11. A fixing system according to claim 2, wherein the cavities forming the housing have a section in a plane perpendicular to the axis of the pump body which is a rounded shape with different radii of curvature for each of the cavities.

12. A fixing system according to claim 2, wherein the cavities each have a generally cylindrical shape with the axis of each cylinder parallel to said contacting faces of the upper ring and end of the pump body, the cavities forming a housing when coupled which has a section of rounded shape in the plane perpendicular to the axes of the cylinders, with different radii of curvature in the section for each of the cavities.

* * * * *